(12) United States Patent
Popescu et al.

(10) Patent No.: US 8,861,638 B2
(45) Date of Patent: Oct. 14, 2014

(54) TRANSMITTER WITH REDUCED PEAK-TO-MEAN AMPLITUDE RATIO

(75) Inventors: Andrei Popescu, Cambridge (GB); Chunyang Yu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 328 days.

(21) Appl. No.: 13/245,464

(22) Filed: Sep. 26, 2011

(65) Prior Publication Data

US 2013/0077706 A1 Mar. 28, 2013

(51) Int. Cl.
*H04L 27/00* (2006.01)

(52) U.S. Cl.
USPC ............................................. 375/295

(58) Field of Classification Search
CPC .................................. H04L 27/2621
USPC ....................................... 375/295
See application file for complete search history.

(56) References Cited

U.S. PATENT DOCUMENTS

| | | | |
|---|---|---|---|
| 6,141,132 A | 10/2000 | Palmer et al. | |
| 2001/0038605 A1 | 11/2001 | Tiedermann et al. | |
| 2005/0254592 A1* | 11/2005 | Naguib et al. | 375/267 |
| 2009/0086838 A1* | 4/2009 | Imamura | 375/260 |
| 2010/0034186 A1 | 2/2010 | Zhou et al. | |
| 2010/0189191 A1* | 7/2010 | Taoka et al. | 375/295 |
| 2011/0013721 A1 | 1/2011 | Liao et al. | |
| 2011/0090997 A1* | 4/2011 | Han et al. | 375/354 |
| 2011/0194650 A1* | 8/2011 | Lee et al. | 375/316 |
| 2011/0228878 A1 | 9/2011 | Sorrentino | |

OTHER PUBLICATIONS

Dammann et al., "Transmit/Receive-Antenna Diversity Techniques for OFDM Systems", European Transactions on Telecommunications, Wiley & Sons, Chichester, Gb, vol. 13, No. 5, Sep. 1, 2001, pp. 531-538.*
Bauch, "Orthogonal frequency division multiple access with cyclic delay diversity." ITG Workshop on Smart Antennas, 2004, Issue Date: Mar. 18-19, 2004, on pp. 17- 24.*
Iir, R1-050795, "Intra-Node B Macro Diversity based on Cyclic Delay Transmissions," 3GPP TSG RAN WG1 Meeting #42, London, UK, Aug. 29, 2005.*
Search Report issued Feb. 15, 2012 in corresponding British application GB1117778.9.

* cited by examiner

*Primary Examiner* — Juan A Torres
(74) *Attorney, Agent, or Firm* — Pillsbury Winthrop Shaw Pittman LLP

(57) ABSTRACT

The present application relates to a method for reducing the peak-to-mean amplitude ratio of a transmission signal comprising a plurality of coherent replicated signals, and to a transmitted for transmitting such a signal. The transmission signal is separated into the plurality of coherent replicated signals and one of the plurality of replicated signals is delayed with respect to another of the plurality of replicated signals, either in the time domain by introducing a time delay or in the frequency domain by introducing a phase shift. This has the effect of reducing the coherence of the delayed replicated signal with respect to the other replicated signal, reducing the peak power of the signal and therefore reducing the peak-to-mean amplitude ratio of the transmission signal.

10 Claims, 3 Drawing Sheets

TRANSMITTER WITH REDUCED PEAK-TO-MEAN AMPLITUDE RATIO

TECHNICAL FIELD

The present application relates to a transmitter for transmitting a transmission signal comprising a plurality of coherent replicated signals, and to a method employed by such a transmitter.

BACKGROUND TO THE INVENTION

The IEEE standard 802.11n-2009 is a standard for wireless communications using Orthogonal Frequency Division Multiplexing (OFDM) modulation schemes. Under these schemes an inverse fast Fourier transform (IFFT) is used to modulate information onto equally spaced frequency tones (sub-carriers) contained within a frequency band or channel which has a bandwidth of 40 MHz.

The IEEE standard 802.11n-2009 defines three data packet formats or transmission modes. The first of these formats is a non high throughput (Non-HT) format. The second packet format is a high throughput mixed (HT-MF) format, whilst the third format is a high throughput green field (HT-GF) format. The IEEE standard 802.11n-2009 specifies that a Non-HT wireless station (such as a fixed wireless access point or a mobile telephone, for example) can only transmit and receive non-HT data packets. A high throughput (HT) wireless station can transmit and receive non-HT and HT-MF data packets and optionally HT-GF data packets.

Under the IEEE standard 802.11n-2009 data is transmitted using multiple sub-carriers within 20 MHz channels. For HT wireless stations, the standard optionally permits data transmissions in which two adjacent channels, known as a primary channel and a secondary channel, are combined to form a 40 MHz channel. In the HT-MF and HT-GF modes this increased bandwidth results in a higher data rate for modulations other than the MCS32 modulation and coding scheme, whilst in the non-HT mode the same data is transmitted simultaneously on both channels, with a phase shift being introduced to the data transmitted on one channel with respect to the data transmitted on the other channel, giving rise to a transmission mode known as Non-HT Duplicate Mode. Non-HT wireless stations can only transmit in 20 MHz channels and cannot receive HT-MF and HT-GF transmissions from 40 MHz capable HT stations. A 40 MHz capable HT station can transmit and receive 20 MHz data packets.

It has been found that when data signals modulated using the non-HT duplicate mode modulation scheme are interpolated to a higher sampling rate than usual, for example twice the sampling rate of the data to be transmitted (which is equal to the channel bandwidth of the transmitted signal), the interpolated signals have higher peak-to-mean amplitude ratios than those of normal 40 MHz centred modulation schemes such as the modulation and coding scheme MCS7. The same problem exists for the MCS32 modulation and coding scheme defined in the IEEE standard 802.11n-2009. This is illustrated in the graph of FIG. 1, which shows peak to mean amplitude ratios for the MCS7, MCS32 and Non-HT Duplicate modulation schemes.

A high peak-to-mean amplitude ratio can impose a number of problems for subsequent processing of the signal to be transmitted, such as low efficiency of a power amplifier of the transmitter, wide dynamic range for digital processing and more strict fidelity requirements for analogue circuitry of the transmitter.

The reason for the high peak-to-mean amplitude ratio of duplicate modulation schemes such as MCS32 and non-HT duplicate lies in the signal structure of duplicate mode modulated signals, as will be explained below. A payload symbol of a 20 MHz duplicate mode transmission can be represented as a continuous time signal $r_{20Mdup}(t)$:

$$r_{20Mdup}(t) = \sum_{k=-26}^{26} S_k \{\exp(j2\pi(k-32)t\Delta_F) + \exp(j2\pi(k+32)t\Delta_F)\} \quad (1)$$

$$= [\exp(-j64\pi\Delta_F t) + \exp(j64\pi\Delta_F t)] \sum_{k=-26}^{26} S_k \exp(j2\pi k t\Delta_F)$$

$$= \left[\exp\left(-j\frac{\pi}{2}Ft\right) + \exp\left(j\frac{\pi}{2}Ft\right)\right] \sum_{k=-26}^{26} S_k \exp(j2\pi k t\Delta_F)$$

$$= \left[\exp\left(-j\frac{\pi}{2}Ft\right) + \exp\left(j\frac{\pi}{2}Ft\right)\right] r_{20M}(t)$$

In the above equations, F is 40 MHz, $S_k$ is a complex number that represents the amplitude and phase of the of the kth sub-carrier in the frequency band of the transmitted "duplicate" data symbol and $\Delta_F$ represents the frequency spacing between sub-carriers, whilst $r_{20M}(t)$ is a continuous time signal representing the "original" data symbol.

This can be further expressed as $$r_{20Mdup}(t) = \left[\exp\left(-j\frac{\pi}{2}Ft\right) + \exp\left(j\frac{\pi}{2}Ft\right)\right] r_{20M}(t) \quad (2)$$

$$= (1+j) * \left(\cos\left(\frac{\pi}{2}Ft\right) - \sin\left(\frac{\pi}{2}Ft\right)\right) r_{20M}(t)$$

$$= (1+j)\sqrt{2} \cos\left(\frac{\pi}{2}Ft + \frac{\pi}{4}\right) r_{20M}(t)$$

These equations are based on equations 20-60 and 20-61 on pages 302 and 303 respectively of IEEE standard 802.11n-2009, where for simplicity it has been assumed that the matrix Q is equal to 1 for a single spatial stream, and the time delays for OFDM symbols and the differences between data and pilot subcarriers are ignored. In equation 1 above the same notation $S_k$ is used regardless of whether k is a data or pilot sub-carrier.

The mean power of $r_{20Mdup}(t)$ is $$E[|r_{20Mdup}(t)|^2] = E\left[|1+j|^2 2\cos^2\left(\frac{\pi}{2}Ft + \frac{\pi}{4}\right)|r_{20M}(t)|^2\right] = 2E[|r_{20M}(t)|^2] \quad (3)$$

The peaks of $r_{20M}(t)$ occasionally coincide with maxima in the expression $$q(t) = (1+j)\sqrt{2}\cos\left(\frac{\pi}{2}Ft + \frac{\pi}{4}\right).$$

The maximum magnitude of q(t) is 2, i.e. max(|q(t)|)=2, so that when the peaks of $r_{20M}(t)$ coincide with the peaks in q(t) the amplitude of the peaks of $r_{20Mdup}(t)$ is twice the amplitude of the peaks of $r_{20M}(t)$. Hence the RMS value of $r_{20Mdup}(t)$ is greater than that of $r_{20M}(t)$ by a factor of $\sqrt{2}$, whilst the peaks of $r_{20Mdup}(t)$ are twice the amplitude of $r_{20M}(t)$. In other words, the peak-to-mean amplitude ratio of $r_{20Mdup}(t)$ is $\sqrt{2}$ times (3 dB) greater than that of $r_{20M}(t)$. For 40 MHz HT-MF and HT-GF signals other than MCS32, the signals in the upper and lower 20 MHz bands are independent and as a result their peak to mean amplitude ratio is not increased in this way.

This problem occurs not only in duplicate mode modulation schemes under the IEEE standard 802.11n, but also in non-HT duplicate modes in the draft IEEE 802.11ac standard.

SUMMARY OF INVENTION

The present application relates to a method for reducing the peak-to-mean amplitude ratio of a transmission signal comprising a plurality of coherent replicated signals, and to a transmitter for transmitting such a signal. The transmission signal is separated into the plurality of coherent replicated signals and one of the plurality of replicated signals is delayed with respect to another of the plurality of replicated signals, either in the time domain by introducing a time delay or in the frequency domain by introducing a phase shift. This has the effect of reducing the coherence of the delayed replicated signal with respect to the other replicated signal, reducing the peak power of the transmission signal and therefore reducing its peak-to-mean amplitude ratio.

According to a first aspect of the present invention there is provided a transmitter for transmitting a transmission signal containing a plurality of replicated coherent signals, the transmitter comprising a processor configured to separate the transmission signal into the plurality of replicated coherent signals and a delay element configured to introduce a relative delay between one of the replicated coherent signals and another of the replicated coherent signals.

The transmitter of the present invention provides a reduction in the peak-to-mean amplitude ratio of a transmitted signal compared to prior art devices, which simplifies the design of other components such as power amplifiers and analogue circuitry. If desired the transmitter can be implemented without modifying existing modulators, thereby permitting reuse of existing components and therefore simple modification of existing transmitters. Additionally, signals transmitted by the transmitter of the present invention can be correctly received and demodulated by existing standard-compliant receivers, and thus backward compatibility is ensured.

The transmission signal may be a modulated signal.

The plurality of replicated coherent signals may be time domain signals and the delay element may be configured to introduce a time delay into one of the plurality of time domain signals.

Alternatively, the plurality of replicated signals may be frequency domain signals and the delay element may be configured to introduce a phase shift into one of the plurality of frequency domain signals.

The delay introduced by the delay element may be equivalent to 1 to 4 samples of the transmission signal.

The transmission signal may comprise upper and lower channel signals and the delay element may be configured to introduce the relative delay into the upper channel signal or the lower channel signal.

The transmission signal may be a 20 MHz duplicate mode transmission signal and the processor may be configured to sample one of the coherent replicated signals of the transmission signal at a sampling rate of 40 MHz at integer multiples of 25 nanoseconds.

According to a second aspect of the invention there is provided a method for reducing the peak-to-mean amplitude ratio of a transmission signal containing a plurality of replicated coherent signals, the method comprising: separating the transmission signal into the plurality of replicated coherent signals and introducing a relative delay between one of the replicated coherent signals and another of the replicated coherent signals.

The transmission signal may be a modulated signal.

The plurality of replicated coherent signals may be time domain signals and the delay may be introduced by introducing a time delay into one of the plurality of time domain signals.

Alternatively, the plurality of replicated signals may be frequency domain signals and the delay may be introduced by introducing a phase shift into one of the plurality of frequency domain signals.

The delay introduced may be equivalent to 1 to 4 samples of the transmission signal.

The transmission signal may comprise upper and lower channel signals and the method may comprise introducing the relative delay into the upper channel signal or the lower channel signal.

The transmission signal may be a 20 MHz duplicate mode transmission signal and the method may further comprise sampling one of the coherent replicated signals of the transmission signal at a sampling rate of 40 MHz at integer multiples of 25 nanoseconds.

BRIEF DESCRIPTION OF THE DRAWINGS

Embodiments of the invention will now be described, strictly by way of example only, with reference to the accompanying drawings, of which

DESCRIPTION OF THE EMBODIMENTS

Figure 1:
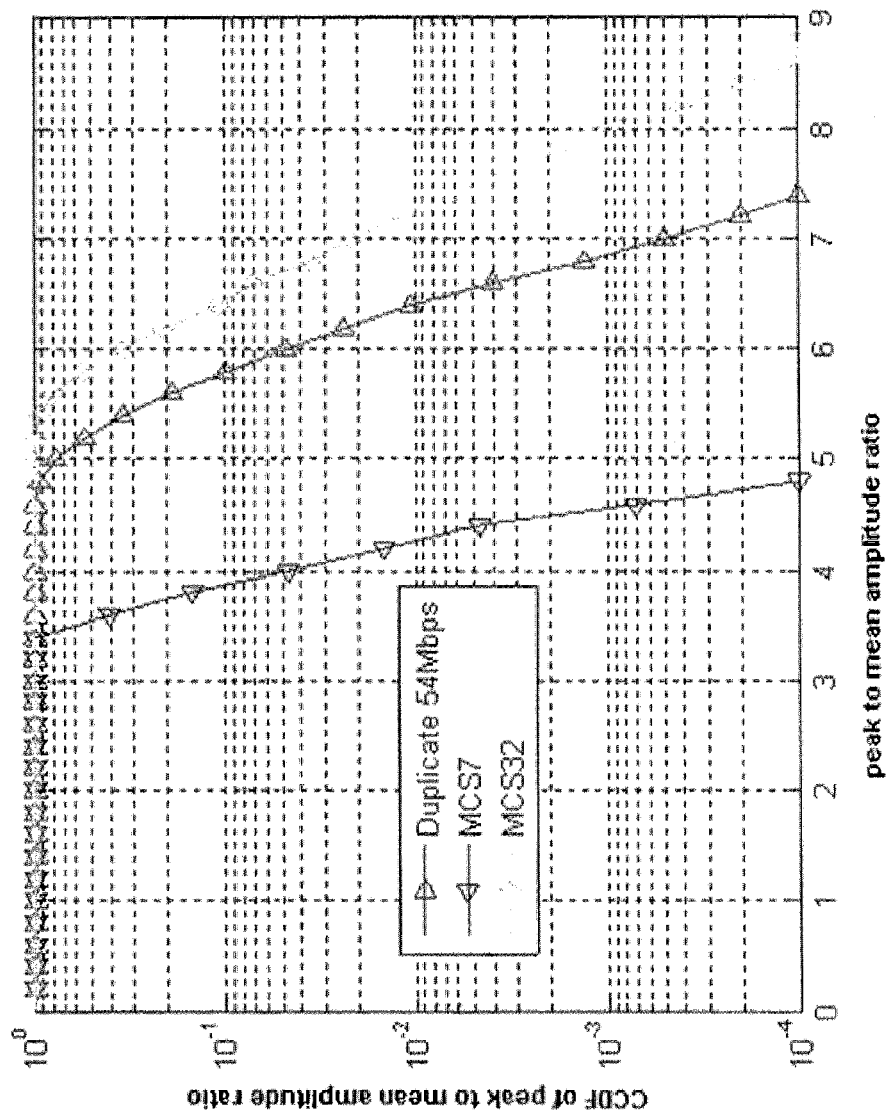
FIG. 1 is a graph illustrating peak-to-mean amplitude ratios for the MCS7, MCS32 and Non-HT Duplicate modulation schemes.
Figure 2:
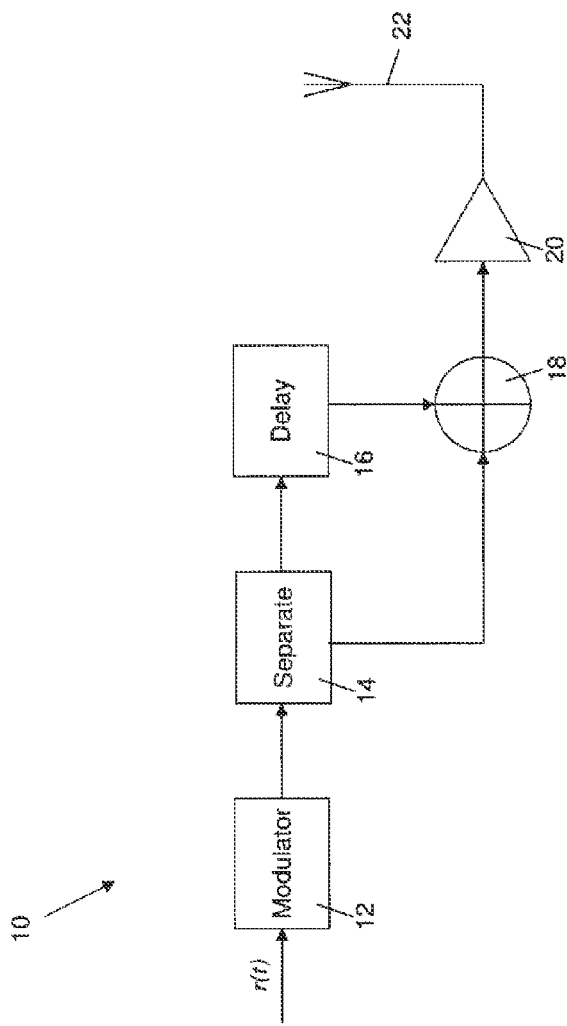
FIG. 2 is a schematic representation of part of a transmitter for transmitting a transmission signal comprising a plurality of coherent replicated signals.

Referring to FIG. 2, part of a transmitter for transmitting a transmission signal comprising a plurality of coherent replicated signals is shown generally at 10. It will be appreciated that the functional blocks shown in FIG. 2 represent processing steps performed in the transmitter 10, and do not necessarily represent physical components of a transmitter. Moreover, it is to be appreciated that the functional blocks shown in FIG. 2 represent only those functions that are relevant to the present invention. In practice, a transmitter may implement many other functions in addition to those shown in FIG. 2.

The transmitter 10 includes a modulator 12 which receives at its input data to be modulated onto a carrier. The modulator 12 modulates the data onto the carrier and generates at its output a modulated signal which comprises a plurality of coherent replicated signals. For example, in a transmitter for transmitting signals modulated using the non-HT duplicate or MCS32 modulation schemes defined in the IEEE standard 802.11n-2009, the signal output by the modulator 12 may comprise duplicate signals for transmission in adjacent upper and lower channels of 20 MHz bandwidth.

The modulated signal output by the modulator 12 is input to a processor 14, which is operative to separate the plurality of coherent replicated signals of the modulated signal from each other. For example, where the modulator 12 is configured to generate a modulated signal using the non-HT duplicate or MCS32 modulation schemes defined in the IEEE standard 802.11n-2009, the processor 14 is configured to separate the duplicate signal in the upper channel from the duplicate signal in the lower channel.

The processor 14 outputs one of the plurality of coherent replicated signals to a delay element 16, whilst the other(s) of the plurality of coherent replicated signals are output to a summation element 18. For example, where the plurality of coherent replicated signals are signals in the upper and lower channels of a non-HT duplicate or MCS32 modulated signal, the duplicate signal in either the upper or lower channel is output by the processor 14 to the delay element 16, whilst the duplicate signal in the other channel is output to the summation element 18.

The delay element 16 is configured to output a delayed version of the input signal, and thus can be said to introduce a delay into the input signal. Where the input is a sampled version of a time domain signal, the delay element 16 may be configured to delay the input signal by a predetermined number of sample periods of the signal to be transmitted. In an alternative embodiment in which the input signal is a frequency domain signal, the delay element 16 may instead be configured to introduce a predetermined phase change which is equivalent to a delay of a predetermined number of sample periods in a time domain signal.

The output of the delay element 16 is connected to an input of the summation element 18, such that the delayed version of the selected coherent replicated signal is added to the other(s) of the plurality of coherent replicated signals. The output of the summation element 18 therefore contains a plurality of replicated signals, of which one is delayed relative to the other(s).

The output of the summation element 18 is connected to downstream components such as a power amplifier 20, which in turn drives a transmit antenna 22 to transmit the signal output by the amplifier 20.

The delay introduced by the delay element 16 to one of the plurality of coherent replicated signals has the effect of reducing the coherence of the delayed replicated signal with the other replicated signals. This in turn reduces the peak-to-mean amplitude ratio of the transmitted signal, as the amplitude of peaks in the transmitted signal is lower, as will now be explained.

When a delay of $\Delta$ is introduced into a non-HT duplicate signal as defined by the IEEE standard 802.11n-2009, the duplicate mode signal is no longer defined by equation 20-61 of IEEE standard 802.11n-2009, but instead can be defined as $$r_{LEG\_DUP}^{iTX}(t) = \tag{4}$$

$$\frac{1}{\sqrt{N_{HT-Duplicate}^{Tone}}} \sum_{n=0}^{N_{Sym}-1} W_{T_{SYM}}(t - nT_{SYM}) \sum_{k=-N_{SR}}^{N_{SR}} (D_{k,n} + p_{n+1}P_k)$$

$$(\exp(j2\pi(k-32)\Delta_F(t - nT_{SYM} - T_{GI} - T_{CS}^{iTX})) +$$

$$j\exp(j2\pi(k+32)\Delta_F(t - nT_{SYM} - T_{GI} - T_{CS}^{iTX} - \Delta)))$$

In practical terms there are many ways in which a relative delay can be introduced between different ones of a plurality of replicated coherent signals (e.g. the upper and lower bands of a non-HT duplicate signal). In the embodiment illustrated in FIG. 2, the processor 14 is configured to separate the different ones of the plurality of replicated coherent signals, and the delay element is configured to apply a delay to one of the plurality of replicated coherent signals, as will be described below.

As is explained above, a payload symbol of a 20 MHz duplicate mode transmission can be represented as a continuous time signal:

$$r(t) = r_{20Mdup}(t) = \left[\exp\left(-j\frac{\pi}{2}Ft\right) + j\exp\left(j\frac{\pi}{2}Ft\right)\right]r_{20M}(t)$$

If this signal is sampled at 40 MHz at exact time instants $k\Delta t$, where $k=0, 1, 2, \ldots$, and $\Delta t=25$ ns then the equation above can be written $$r(k) = \left[\exp\left(-j\frac{\pi}{2}k\right) + j\exp\left(j\frac{\pi}{2}k\right)\right]r_{20M}(k) = r_u(k) + r_l(k),$$

where $r_u(k)$ is the kth sample of the payload data signal in an upper channel or band of a duplicate mode transmission, and $r_l(k)$ is the kth sample of the payload data signal in a lower channel or band of a duplicate mode transmission.

$$r_l(k) = \exp\left(-j\frac{\pi}{2}k\right)r_{20M}(k) \text{ and } r_u(k) = j\exp\left(j\frac{\pi}{2}k\right)r_{20M}(k).$$

Hence, $r(k)=r_u(k)+r_l(k)=r_l(k)(1+j(-1)^k)$, so $r_l(k)$ can be extracted from $r(k)$ as:

$$r_l(k) = \frac{r(k)}{(1 + j(-1)^k)} = \frac{r(k)(1 - j(-1)^k)}{2}.$$

$$\text{Similarly, } r_u(k) = \frac{r(k)(1 + j(-1)^k)}{2}.$$

In the example where the signal to be transmitted is a non-HT duplicate mode signal, the processor 14 extracts the duplicate signals in the upper and lower channels using the steps described above. One of the extracted upper and lower channel signals is input to the delay element 16, which applies a delay to the input signal to delay it with respect to the other of the extracted signals.

With $r(k)=r^i(k)+jr^q(k)$ being the standard signal generated according to equations (20-60) or (20-61) of IEEE standard 802.11n-2009 at the sample rate of 40 MHz, and with D being the desired delay in samples at the base sample rate, the duplicate delayed signal can be expressed as $r_{dup\_delayed}(k) = r_{new}^i(k) + jr_{new}^q(k)$, where $$r_{new}^i(k) = \frac{r^i(k) + (-1)^k r^q(k) + r^i(k - D) - (-1)^{k-D} r^q(k - D)}{2} \tag{5}$$

$$r_{new}^q(k) = \frac{r^q(k) - (-1)^k r^i(k) + r^q(k - D) + (-1)^{k-D} r^i(k - D)}{2}$$

The power of the duplicate delayed signal is equal to the power of the original undelayed signal. However, the delay applied reduces the coherence between the upper and lower channel signals, thus reducing the probability of large peaks occurring simultaneously in the replicated signals. Therefore the peak-to-mean amplitude ratio is reduced in comparison to the peak-to-mean amplitude ratio of the standard signal.

In an alternative embodiment, the delay element 16 applies a corresponding delay to a frequency domain signal by applying an appropriate phase shift corresponding to the time delay of D samples.

Figure 3:
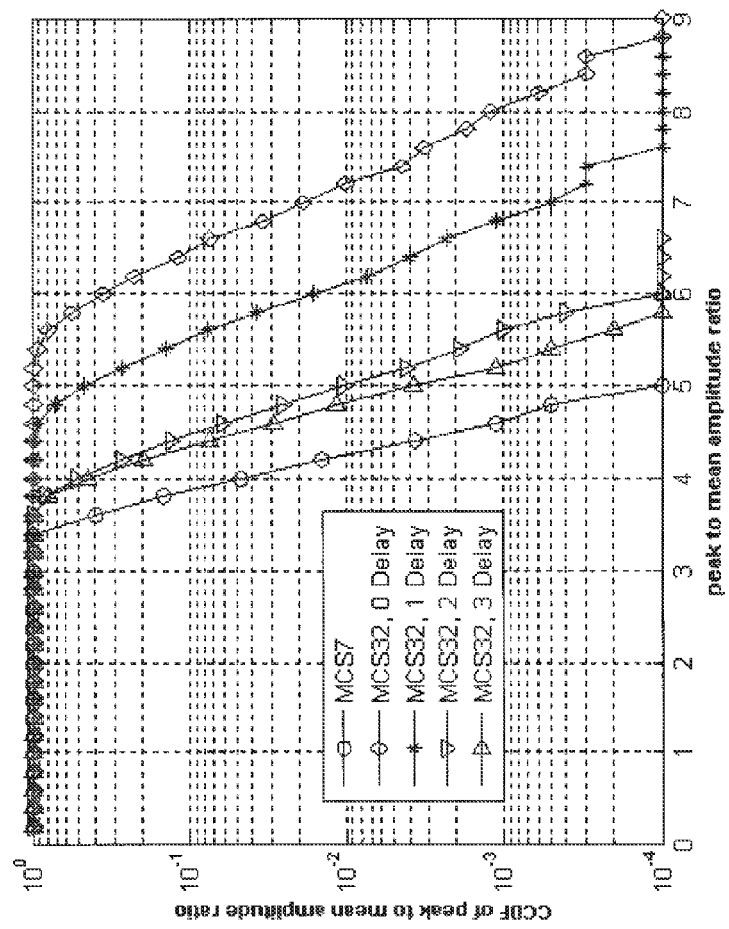
FIG. 3 is a graph illustrating peak-to-mean amplitude ratios for a transmission signal modulated using the MCS32 modulation scheme with different delays applied to a replicated signal contained in the transmission signal.

The purpose of the delay introduced by the delay element 16 is to reduce the coherence between the delayed replicated signal with the other replicated signals. A delay of one to four sample periods (of the replicated signals) is sufficient to achieve this objective, as can be seen from the graph of FIG. 3. A relatively short delay of the order of one to four sample periods is advantageous, as only a small number of physical components such as registers are required to implement the delay element 16, so the complexity, size and cost of the delay element 16 can be kept to a minimum. Additionally, a signal transmitted by the transmitter 10 with a small delay in one of the replicated coherent signals can be received and decoded correctly by a receiver compliant with the IEEE standard 802,11n-2009, whereas a larger delay may cause reception problems. A larger delay may also increase the Error Vector Magnitude (EVM) of the transmitted signal to an unacceptable level, especially when clipping (saturation) occurs.

In an alternative embodiment, the processor 14 and the delay element 16 form part of the modulator 12, and are configured to apply the delay to one or more of the plurality of replicated signals.

It will be appreciated that the present invention permits a reduction in the peak-to-mean amplitude ratio of a transmitter in a manner that is straightforward to implement. In the embodiment where the delay is applied to the modulated signal outside the modulator 12 no changes are required to the modulator of the transmitter, thus further simplifying implementation. Moreover, the signals transmitted by the transmitter can be correctly received and demodulated by any receiver that is compliant with the IEEE802.11n standard.

The term "peak-to-mean amplitude ratio" used in this specification refers to the ratio of a signal's peak amplitude to its mean amplitude. The term "peak-to-mean power ratio" or "crest factor" is often used in the same context, to refer to the ratio of a signal's peak power to its mean power. It will be appreciated that these terms all relate to the same concept of a ratio of a signal's peak to its mean value, and those skilled in the art may use the different terms interchangeably, it will be understood that for the purposes of the present invention, provided that the same criteria are applied to the peak and mean values, peak-to-mean amplitude ratio and peak-to-mean power ratio are effectively equivalent.

The invention claimed is:

1. A transmitter for transmitting a transmission signal, the transmitter comprising:
   a processor; and
   a delay element,
   wherein the transmission signal contains a plurality of replicated coherent data signals, each of the plurality of replicated coherent data signals carrying the same data, and wherein:
   the processor is configured to separate the transmission signals into the plurality of replicated coherent signals;
   the delay element is configured to introduce a relative delay between one of the replicated coherent signals and another of the replicated coherent signals, wherein the transmission signal comprises upper and lower channel signals and the delay element is configured to introduce the relative delay into the upper channel signal or the lower channel signal; and
   the transmission signal is a 20 MHz duplicate mode transmission signal and the processor is configured to sample one of the coherent replicated signals of the transmission signal at a sampling rate of 40 MHz at integer multiples of 25 nanoseconds.

2. A transmitter according to claim 1 wherein the transmission signal is a modulated signal.

3. A transmitter according to claim 1 wherein the plurality of replicated coherent signals are time domain signals and the delay element is configured to introduce a time delay into one of the plurality of time domain signals.

4. A transmitter according to claim 1 wherein the plurality of replicated signals are frequency domain signals and the delay element is configured to introduce a phase shift into one of the plurality of frequency domain signals.

5. A transmitter according to claim 1 wherein the delay introduced by the delay element is equivalent to 1 to 4 samples of the transmission signal.

6. A method for reducing the peak-to-mean amplitude ratio of a transmission signal containing a plurality of replicated coherent data signals, the method comprising:
   separating the transmission signal into the plurality of replicated coherent signals; and
   introducing a relative delay between one of the replicated coherent signals and another of the replicated coherent signals, wherein the transmission signal comprises upper and lower channel signals and the method comprises introducing the relative delay into the upper channel signal or the lower channel signal,
   wherein each of the plurality of replicated coherent data signals carries the same data, and
   wherein the transmission signal is a 20 MHz duplicate mode transmission signal and the method further comprises sampling one of the coherent replicated signals of the transmission signal at a sampling rate of 40 MHz at integer multiples of 25 nanoseconds.

7. A method according to claim 6 wherein the transmission signal is a modulated signal.

8. A method according to claim 6 wherein the plurality of replicated coherent signals are time domain signals and the delay is introduced by introducing a time delay into the one of the plurality of time domain signals.

9. A method according to claim 6 wherein the plurality of replicated signals are frequency domain signals and the delay is introduced by introducing a phase shift into one of the plurality of frequency domain signals.

10. A method according to claim 6 wherein the delay introduced is equivalent to 1 to 4 samples of the transmission signal.

* * * * *